March 5, 1929.  E. L. HOAGLUND  1,704,606
MULTIPLE SPEED HYDRAULIC TRANSMISSION
Filed June 4, 1928  3 Sheets-Sheet 1
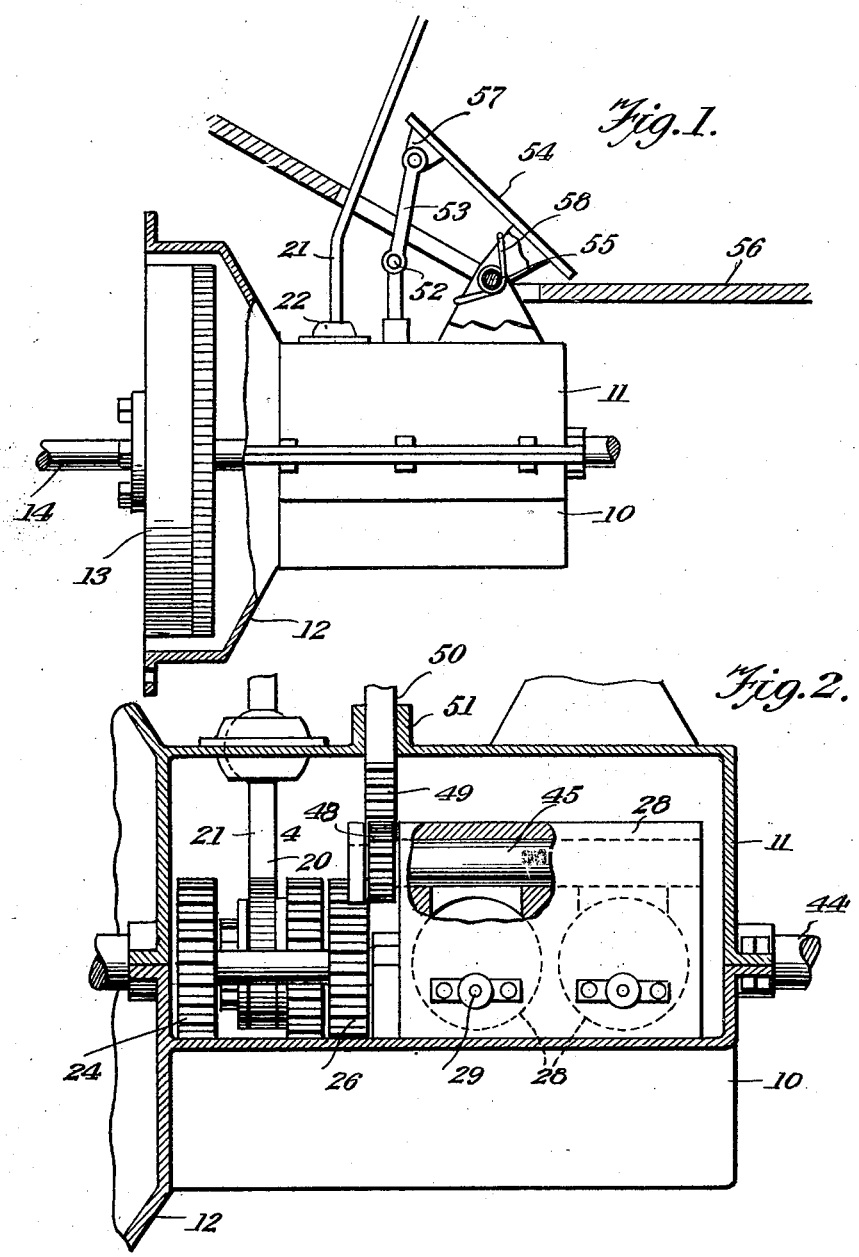
Elmer L. Hoaglund
INVENTOR
BY Victor J. Evans
ATTORNEY March 5, 1929.  E. L. HOAGLUND  1,704,606
MULTIPLE SPEED HYDRAULIC TRANSMISSION
Filed June 4, 1928  3 Sheets-Sheet 2

Inventor
Elmer L. Hoaglund
By Victor J. Evans
Attorney

March 5, 1929. E. L. HOAGLUND 1,704,606
MULTIPLE SPEED HYDRAULIC TRANSMISSION
Filed June 4, 1928  3 Sheets-Sheet 3
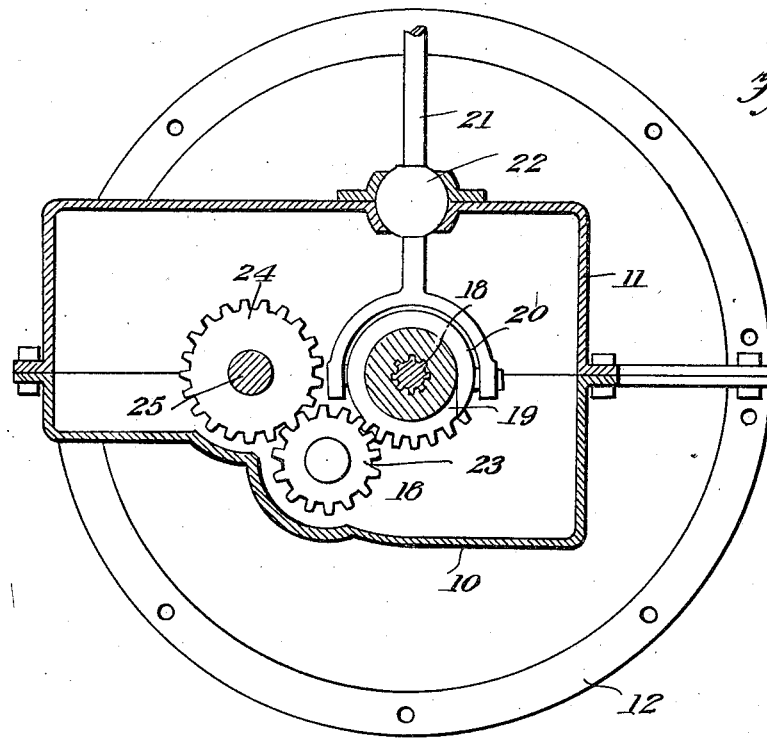
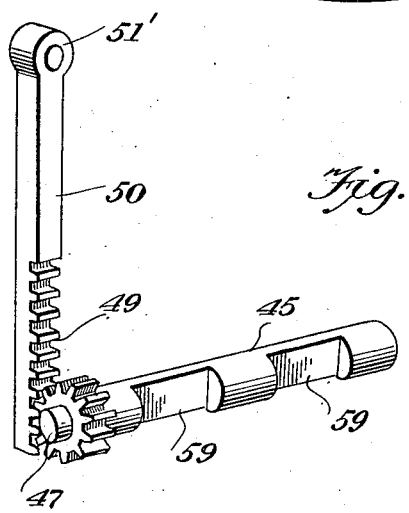
Elmer L. Hoaglund
INVENTOR
BY Victor J. Evans
ATTORNEY Patented Mar. 5, 1929.

1,704,606

UNITED STATES PATENT OFFICE.

ELMER LEONARD HOAGLUND, OF WILKINSBURG, PENNSYLVANIA.

MULTIPLE-SPEED HYDRAULIC TRANSMISSION.

Application filed June 4, 1928. Serial No. 282,740.

This invention relates to improvements in power transmissions.

An object of the invention contemplates the oblivion of certain speed gears.

Another object of the invention comprehends a hydraulic clutch mechanism adapted to increase or decrease speed from a certain gear speed.

A further object of the invention embodies the characteristic of obviating gear clashing by accelerating the speed from a certain gear speed to that of direct drive.

In addition, instant changes in gear speeds from low to high may be effected with the power plant in gear.

With the above and other objects in view, the invention further consists of the following novel features and details of construction, to be hereinafter more fully described, illustrated in the accompanying drawings and pointed out in the appended claim.

In the drawings:—

Figure 1 is fragmentary side elevation of a fly-wheel housing and transmission case enclosing the present invention.

Figure 2 is a longitudinal sectional view taken through the transmission housing.

Figure 5 is a horizontal sectional view taken through the clutch mechanism for the gear shafts.

Figure 6 is a perspective view of the control mechanism for the hydraulic clutch mechanism.

Figure 3:
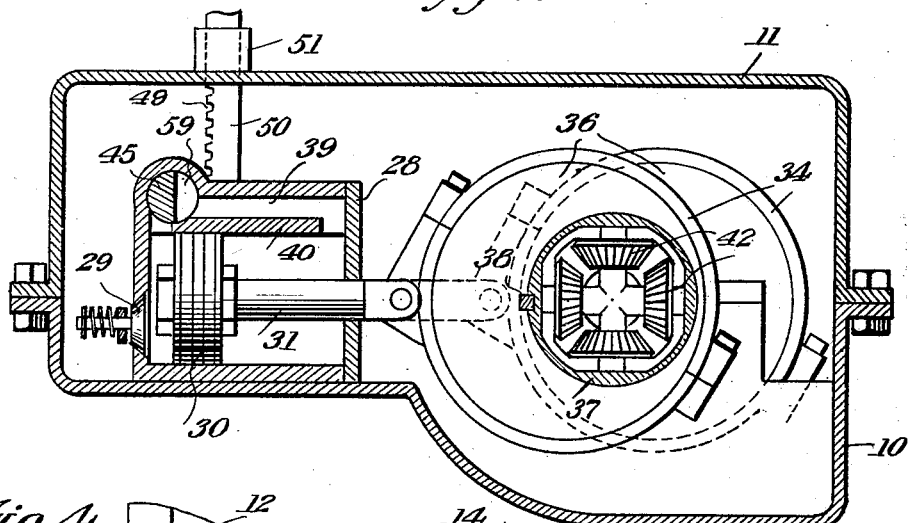
Figure 3 is a horizontal sectional view taken through the transmission.
Figure 4:
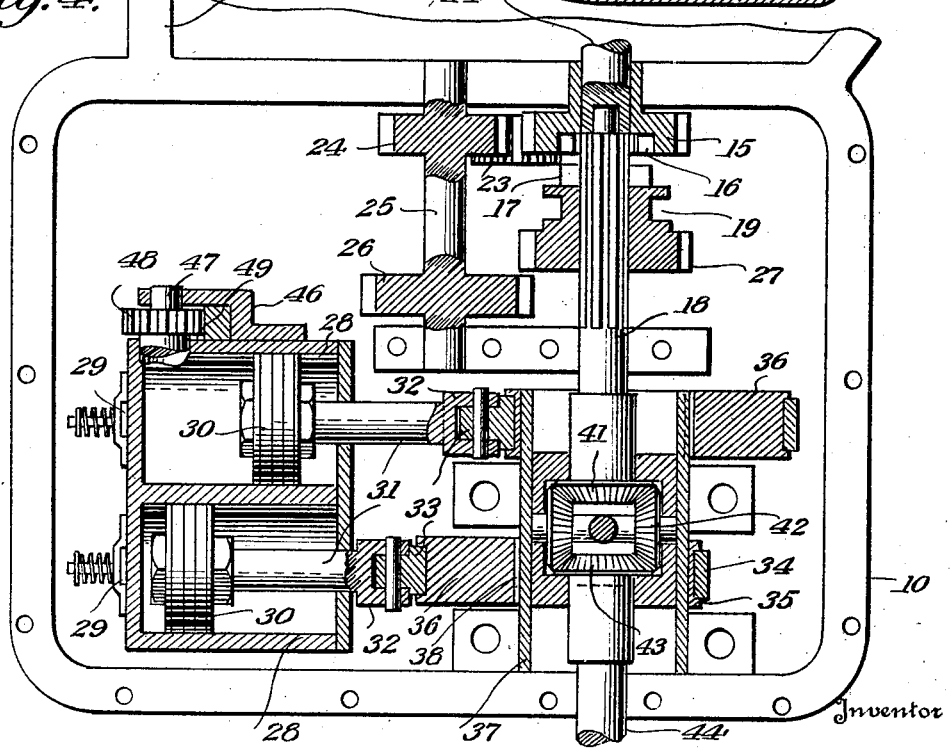
Figure 4 is a top plan view of the present invention in section within the housing and having the housing cover plate removed.

Referring to the drawings in detail, wherein like characters of reference denote corresponding parts, the reference character 10 indicates a transmission housing provided with a cover plate 11, both of which being adapted for communication with an enlarged housing 12 for a flywheel 13 carried upon a motor or crank shaft 14.

A gear member 15, carried upon the rearmost projecting end of the crank shaft 14 positioned within the housing 10, is provided with a countersunk gear face 16 adapted for meshing engagement with a slide gear 17 carried upon a splined drive shaft 18. The slide gear 17 is provided with an annular groove 19 adapted to accommodate the forked extremity 20 of a shift lever 21 mounted for rocking movement, as at 22, within the cover plate 11 of the housing 10.

The gear teeth upon the outer periphery of the gear 15 is meshingly engaged with an idler gear 23 which is in turn connected with a gear 24. The gear 24 is fixed upon a shaft 25 which also carries a reverse gear 26 adjacent its opposite end. An enlarged gear 27, carried upon the opposite end of the slide gear 17, is adapted to be meshingly engaged with the reverse gear 26 when the former is slid upon the splined portion of the driving shaft 18 by the gear shift lever 21.

From the foregoing description and accompanying drawings, it is manifest that in the present invention all speed gears are eliminated.

The clutch mechanism, as mentioned in the foregoing, comprises cylinders 28, each of which being provided with intake valves 29 adapted to open upon the suction strokes of the pistons 30. Connecting rods 31, having connection with the pistons, are bifurcated upon their opposite ends, as at 32, to accommodate ears 33 for pivotal connection with bearings 34 mounted within grooves 35 in the outer edges of eccentrics 36.

A cylinder or sleeve, such as indicated at 37, housing a differential, is keyed or otherwise fixed, as indicated at 38, to the eccentrics 36.

As illustrated in Figure 3 of the drawings, bypasses 39 within the cylinders 28, are defined by plate members 40 spaced from the ends of the cylinders whereby oil, air or other agents included within the housing will be directed to and from the opposed sides of the pistons 30 upon the respective strokes thereof.

A unit gear 41, carried upon the innermost end of the driving shaft 18, is meshingly engaged with spider gears 42 which are also meshingly engaged with a unit gear 43, carried upon a propeller shaft 44.

A valve construction, the novel control means for the hydraulic clutch and transmission, contemplates a shaft 45 journaled within the cylinders 38 horizontally thereof and bridging the spaces of adjacent bypasses in the respective cylinders.

An arm 46, carried upon one of the cylinders, is adapted to journal a reduced end or trunnion 47 projected from the outermost end of the shaft 45. A spur gear 48, included upon said outermost end is meshingly engaged with the teeth 49 of a rack bar 50 mounted for reciprocating action within a guide sleeve 51 upon the upper side of the cover plate 11 for the transmission housing 10. The opposed end of the rack bar 50 is enlarged and apertured, as at 51', to accommodate a pivot pin 52 included upon the adjacent end of a pivoted link 53.

A foot pedal or other treadle, such as indicated at 54, pivotally mounted, as at 55, upon the floor boards 56 upon the driving compartment of a motor vehicle, is provided with an ear 57 upon the underside of the free end thereof and which is adapted for pivotal connection with the uppermost end of the pivoted link 53. A spring 58 carried upon the pivot connection 55 for the treadle or pedal 54 is adapted to normally retain same in the position shown in Figure 1 of the drawings.

As illustrated in Figures 3 and 6 of the drawings, the shaft 45 is provided with portions removed or ports 59 adapted for selective registration with the spaces provided at the ends of the plates 40 within the cylinders 28 to check the flow of air, oil or other agents through the cylinders.

When the motor is initially started, the shift gear 17 or the gear face 27 upon the opposite end thereof may be slid upon the splined portion of the driving shaft 18 for meshing engagement with either the gear 15 having connection with the gear 24 or the reverse speed gear 26.

When the cut-out portions or ports 59 in the valve or shaft 45 are brought into registration with the spaces at the aforementioned ends of the plates 40, the oil, air or other agent within the cylinders will be forced through the bypasses by the pistons and it will be noted that the eccentrics will cause the cylinder or differential housing 37 to rotate in conjunction with the spider gears 42, which will roll against the unit gears 41 and 43 respectively without imparting any movement to the propeller shaft 44.

The particular disposition of the valve or shaft 45 is accomplished by a depressed position of the pedal or treadle 54. In the event the gear 24 is in mesh, the gradual release of pressure against the pedal 54 will gradually close the particular bypasses in the cylinders 28 with a resulting decrease in acceleration of the cylinder or differential housing 37. By the same token, the unit gear 43 will be turned in conjunction with the propeller 44 whereby power may be transmitted to the rear end construction of the particular vehicle. When the shaft or valve 45 is disposed in the Figure 3 position, the bypasses will be completely closed and the actions of the pistons 30 will be checked in conjunction with the eccentrics 36 and sleeve 37.

It will thus be noted from the foregoing description and accompanying drawings that the hydraulic clutch transmission will impart a gradually increased speed embodying that of the ordinary three speed transmission and which also obviates the necessity of gear shifting and no slowing up is apparent inasmuch as the gradual increase of power is likened to that of throttle acceleration.

With the present invention, any ratio of speed from low to direct drive may be accomplished merely by the actuation of the pedal 54. The velocity attained is not slackened while changing to higher speeds as there is no need to release the accelerator.

Gear clashing is eliminated inasmuch as all except two gears are obviated and none to mesh or remesh after the vehicle is once started. Furthermore instant changes from higher or lower gears, including neutral position, may be effected with the car in gear.

Although I have described the invention as being primarily adapted for use in conjunction upon motor vehicles, it is obviously understood that the same could be effectively employed for use upon boats or other vehicles.

The invention is susceptible of various changes in its form, proportions and minor details of construction, and the right is herein reserved to make such changes as properly fall within the scope of the appended claim.

Having thus described the invention, what is claimed is:—

A hydraulic transmission comprising a housing, a differential included therein, a cylinder for the differential, eccentrics revolvably mounted upon said cylinder, cylinders, pistons operable within the cylinders connected with the eccentrics, a valve member carried within the cylinders, partitions included within each of the cylinders and spaced from the ends thereof in juxtaposition to that of the remote positions of the pistons therefor, and the valve member having portions removed adapted for communication with the interior of each of the cylinders through the spaces defined at the ends of the partitions.

In testimony whereof I affix my signature.

ELMER LEONARD HOAGLUND.